United States Patent
Gustafson et al.

(10) Patent No.: US 9,677,612 B2
(45) Date of Patent: Jun. 13, 2017

(54) CRANKSHAFT THRUST BEARING AND ENGINE CONTAINING SAME

(71) Applicant: Cummins Inc., Columbus, IN (US)

(72) Inventors: Richard Gustafson, Columbus, IN (US); April Perry, Darlington (GB)

(73) Assignee: Cummins Inc., Columbus, IN (US)

( * ) Notice: Subject to any disclaimer, the term of this patent is extended or adjusted under 35 U.S.C. 154(b) by 28 days.

(21) Appl. No.: 14/717,494

(22) Filed: May 20, 2015

(65) Prior Publication Data

US 2015/0252845 A1 Sep. 10, 2015

Related U.S. Application Data

(63) Continuation of application No. PCT/US2013/072224, filed on Nov. 27, 2013.

(60) Provisional application No. 61/730,768, filed on Nov. 28, 2012.

(51) Int. Cl.

| F16N 1/00 | (2006.01) |
|---|---|
| F16C 33/10 | (2006.01) |
| F16C 9/02 | (2006.01) |
| F16C 17/04 | (2006.01) |
| F16C 33/04 | (2006.01) |

(52) U.S. Cl.
CPC ............ *F16C 33/1065* (2013.01); *F16C 9/02* (2013.01); *F16C 17/04* (2013.01); *F16C 33/046* (2013.01)

(58) Field of Classification Search
CPC .......... F16C 9/02; F16C 17/04; F16C 33/046; F16C 33/10; F16C 33/1025; F16C 33/106; F16C 33/1065
See application file for complete search history.

(56) References Cited

U.S. PATENT DOCUMENTS

| 2,056,099 A | 9/1936 | Grimm |
|---|---|---|
| 2,872,256 A | 2/1959 | Thomson |
| 3,376,083 A | 4/1968 | Muijderman |
| 4,017,127 A | 4/1977 | Smith et al. |
| 6,132,094 A | 10/2000 | Cornelison et al. |
| 6,149,310 A | 11/2000 | Ono et al. |
| 6,481,895 B2 | 11/2002 | Yang et al. |
| 6,976,788 B2 | 12/2005 | Honda et al. |
| 7,174,765 B2 | 2/2007 | Kirchhof et al. |
| 7,258,489 B2 | 8/2007 | Welch et al. |
| 8,534,989 B2 * | 9/2013 | Groves ............... F16C 33/1065 415/111 |
| 2003/0128902 A1* | 7/2003 | Kennedy .................. F16C 9/02 384/275 |
| 2008/0085068 A1 | 4/2008 | Hemmi et al. |
| 2012/0243815 A1 | 9/2012 | Kuwabara et al. |

OTHER PUBLICATIONS

International Searching Authority, International Search Report issued in Application No. PCT/US2013/072224, mailed Apr. 28, 2014, 3 pp.

* cited by examiner

*Primary Examiner* — James Pilkington
(74) *Attorney, Agent, or Firm* — Taft, Stettinius & Hollister LLP

(57) ABSTRACT

Improved fluid supply grooves in the face of an axial thrust bearing for a crankshaft are disclosed. The grooves have a larger cross-sectional area at the outer radius of the bearing body than at the inner radius of the bearing body.

13 Claims, 2 Drawing Sheets

CRANKSHAFT THRUST BEARING AND ENGINE CONTAINING SAME

CROSS-REFERENCE TO RELATED APPLICATION

The present application is a continuation of International Application No. PCT/US2013/072224 filed on Nov. 27, 2013, which claims priority to and the benefit of the filing date of U.S. Provisional App. No. 61/730,768 filed on Nov. 28, 2012, which is incorporated herein by reference in its entirety for all purposes.

TECHNICAL FIELD

This disclosure allows for improved oil feeding to a crankshaft thrust bearing. More particularly, the present invention relates to improved oil supply grooves in a crankshaft thrust bearing.

BACKGROUND

A thrust bearing is used for minimizing axial movement of a crankshaft in an internal combustion engine. One option for lubricating the thrust bearing is to direct oil to the face of the thrust bearing, then allow the oil to drain freely from the bearing housing. It is possible to use a 360 degree thrust bearing, which traps oil emerging from the main bearing to lubricate the thrust bearing. However, this is a costly option and the lower 180 degree bearing associated with the main bearing cap does not provide significant thrust load support. It is also possible to provide pressurized oil to the upper thrust bearing, but this option is also more costly and requires additional block machining operations.

In conventional designs, it was possible to use 360 degree thrust bearings around crankshafts to supply an adequate amount of oil to the upper portion of the bearing. Oil emerging from the main bearing is trapped by the 360 degree thrust bearing, pressurized at the inner radius of the thrust bearing and flows radially outwardly through constant width grooves to the outer radius, providing lubrication supply to the thrust bearing. However, a 360 degree thrust bearing is a more costly option, and the lower portion of the bearing does not provide significant thrust support. FIG. 1 shows a 180 degree bearing assembly 150 of the prior art, in which oil from the main bearing 112 is not trapped by a lower bearing 110 and does not pressurize the inner radius of the upper thrust bearing 120. In this case, the upper bearing 120 is supplied by oil flowing by gravity into constant width grooves. Since the constant width grooves must be sufficiently large to direct gravity feed oil into the bearing 120 from the outer radial surface, oil is not significantly retained in the groove and does not adequately feed the bearing surfaces. It is also possible to provide pressurized oil directly from the oil rifle to the upper thrust bearing 120, but this option is also more costly, requiring additional block machining operations. Therefore, further improvements in this area are needed.

SUMMARY

An improved design for oil feed to thrust bearings for crankshafts is disclosed where an axial face of the thrust bearing includes a number of grooves configured for receiving, retaining and distributing oil on the face of the bearing. Further embodiments, forms, objects, features, advantages, aspects, and benefits shall become apparent from the following description and drawings.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION

Figure 1:
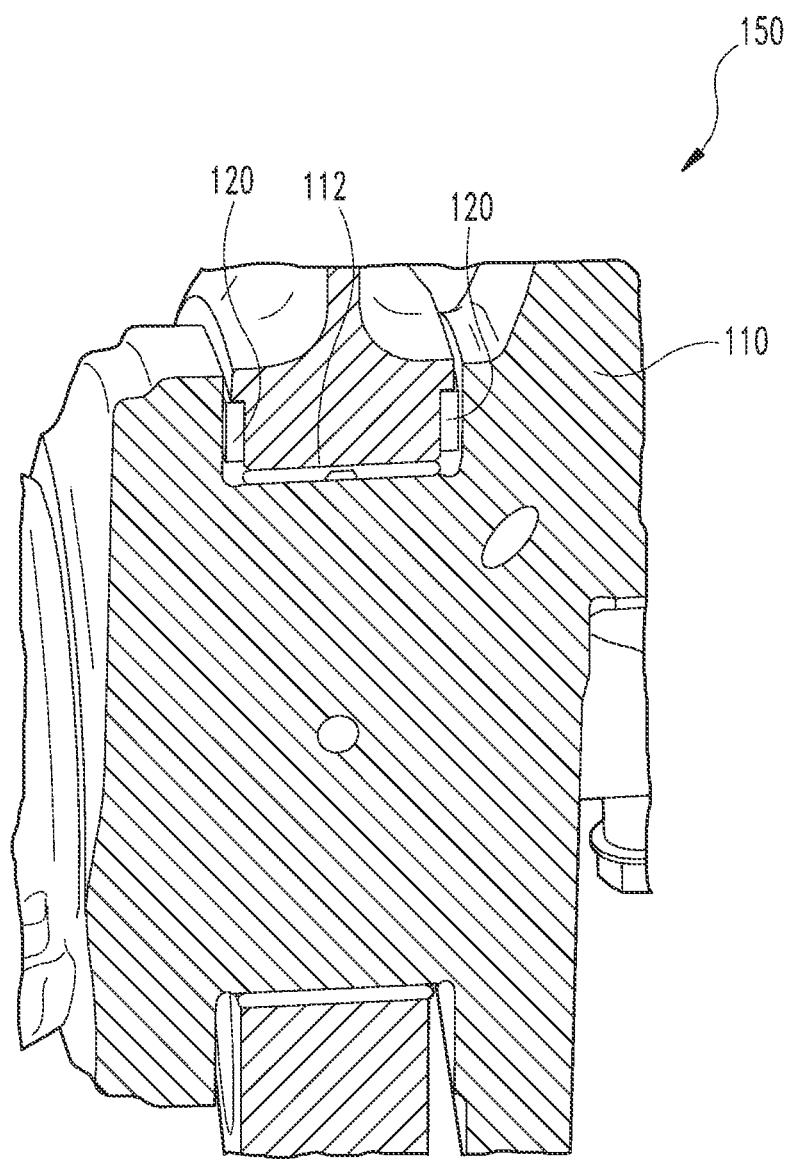
FIG. 1 is a cross-sectional illustration of a bearing assembly indicating an exemplary flow of oil from under the main bearing to the thrust bearings.

For the purpose of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein that would normally occur to one skilled in the art to which the invention relates are contemplated herein.

Figure 2:
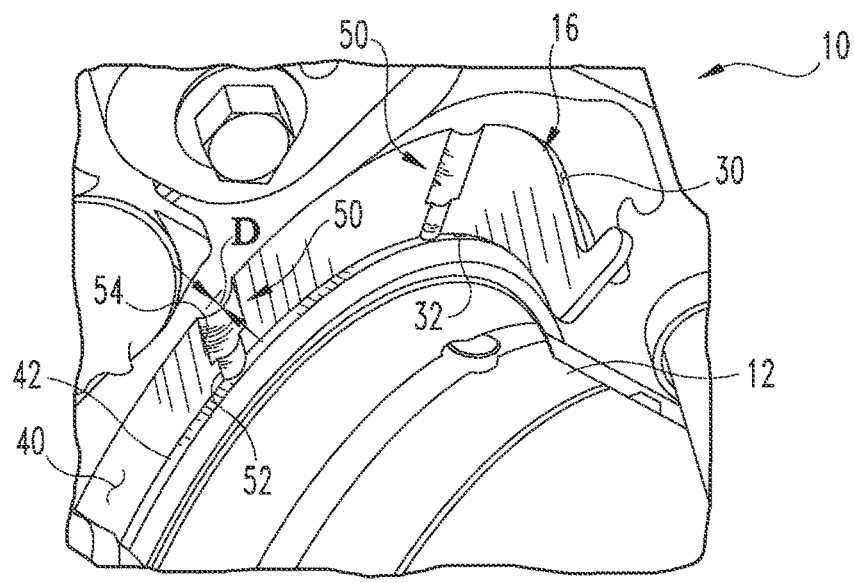
FIG. 2 is a cross-sectional illustration of a portion of a bearing assembly with a thrust bearing including oil supply grooves that are deeper and wider at the outer radius of the thrust bearing than at the inner radius of the thrust bearing.
Figure 3:
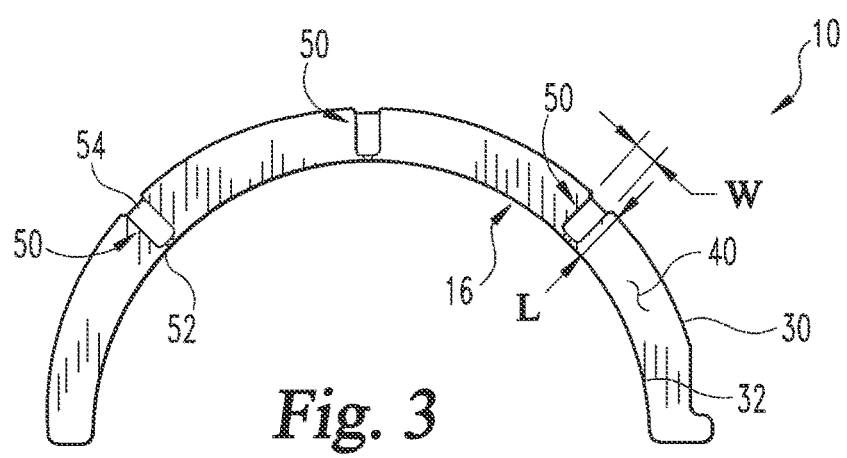
FIG. 3 is an elevation view of the thrust bearing of FIG. 2.

As shown in FIGS. 2-3, one embodiment of the present disclosure includes upper half thrust bearing 10 having a thrust bearing body 16 with radial supply grooves 50 in a face 40 thereof for feeding fluid such as oil to the face of the thrust bearing body 16. The grooves 50 are configured for lubricating fluid to flow by gravity from the outer radius to the inner radius of the thrust bearing, supplying lubrication to the thrust bearing 10. The outer radial portion 54 of the groove 50 is larger, e.g. wider circumferentially and/or deeper axially, to allow oil to flow more easily into the grooves and to hold more oil while the inner radial portion 52 of groove 50 is much smaller in comparison to outer radial portion 54 to retain oil or other fluid in groove 50. The retained fluid in groove 50 provides a reservoir of lubricating fluid available for circumferential transport into the bearing clearance spaces 12, allowing the thrust bearing 10 to function as a support for axial crankshaft loads and positioning. The fluid supply grooves 50 have a circumferential width W, an axial depth D (shown in FIG. 2), and a radial length L. The length L of the fluid supply groove 50 generally corresponds to the distance between the radially inwardly facing surface 32 and radially outwardly facing surface 30 of the thrust bearing body 16. Some embodiments may terminate supply groove 50 prior to radially inwardly facing surface 32.

FIG. 3 shows the half thrust bearing body 16, which includes a semi-circular configuration with a first set of radially opposing faces that define radially inwardly and outwardly facing surfaces 32, 30 and a second set of axially facing opposing faces 40 and 42, of which axial face 40 includes a plurality of grooves 50. The supply grooves 50 are wider and deeper near the radially outwardly facing surface 30 of the thrust bearing body 16 than at radially inwardly facing surface 32. The inner radial portion 52 of the supply groove 50 is shallower and narrower than radial outer portion 54. Each of inner radial portion 52 and outer radial portion 54 extend through and open at the adjacent respective radially inwardly facing surface 32 and radially outwardly facing surface 30.

Figure 4:
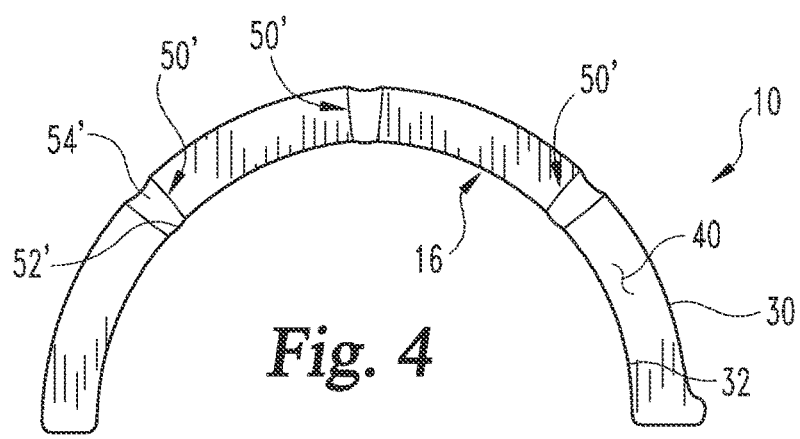
FIG. 4 is an illustration of a thrust bearing including oil grooves with a larger cross-sectional area at the outer radius of the thrust bearing and tapering to a smaller cross-sectional area at the inner radius of the thrust bearing according to another embodiment.

In another exemplary embodiment, the fluid groove 50' may be tapered as shown in FIG. 4 so as to be wider and deeper at the outer radial portion 54' of the groove than at the inner radial portion 52' of the groove. The taper of groove 50' can be continuous as shown or include variable portions from outer radial portion 54' to inner radial portion 52'. The tapered groove configuration assists the gravity feed of oil or other fluid into the groove 50' as oriented on the engine.

Each groove 50, 50' includes an inner radial portion 52, 52' having an exit area smaller, or less than, the opening of outer radial portion 54. 54' of the groove 50, 50' to retain oil or other fluid in the groove. This smaller exit area of inner radial portion 52, 52' restricts the flow of fluid from the supply groove 50, 50' and does not allow the oil to readily or easily flow out of the supply groove 50, 50'. This enhances the supply of oil from each supply groove 50, 50' into the bearing clearance space in a wiping manner thereby gradually feeding oil or fluid as needed for thrust load support of the crankshaft.

The thrust bearing 10 may include multiple oil grooves 50 and/or 50', each having a large outer radial opening 54, 54' for gravity feed of oil into the groove and a small inner radial exit opening 52, 52' to retain oil or fluid in the groove 50, 50' to supply bearing surfaces. Thus a constant and continuous supply of oil is available for extraction from the groove 50, 50' by the rotating crankshaft bearing surface into the bearing clearance space.

Many aspects of the present invention are envisioned. For example, one aspect is directed to a bearing assembly comprising a semi-circular shaped bearing body with two sets of opposing faces. One set of opposing faces includes a radially outwardly facing surface and a radially inwardly facing surface. A second set of opposing faces includes axially outwardly opposing faces. The bearing body has one or more fluid supply grooves extending radially along one of the axially outwardly facing surfaces. The groove has a larger cross-sectional area at the radially outwardly facing surface than a cross-sectional area of the groove at the radially inwardly facing surface of the bearing body.

In one embodiment, the bearing further includes a groove that is tapered from the larger cross-sectional area at the radially outwardly facing surface to the smaller cross-sectional area at the radially inwardly facing surface. In a refinement of this embodiment, the supply groove has a continuously tapered width in the radial direction from the radially outwardly facing surface to the radially inwardly facing surface.

In another embodiment, the supply groove has a constant width along at least a part of its length from the radially outwardly facing surface to the radially inwardly facing surface. The groove is deeper at the radially outwardly facing surface than at the radially inwardly facing surface. In a further embodiment, the depth of the supply groove is constant from the radially outwardly facing surface to the radially inwardly facing surface.

According to another aspect, an apparatus comprises an internal combustion engine with a crankshaft and associated thrust bearings. At least one of the thrust bearings includes a semi-circular shaped bearing body with two sets of opposing faces. One set of opposing faces includes a radially outwardly facing surface and a radially inwardly facing surface. A second set of opposing faces includes axially outwardly facing surfaces. The bearing body has a plurality of fluid supply grooves extending radially along one of the axially outwardly facing surfaces. At least one of the grooves has a larger cross-sectional area at the radially outwardly facing surface than a cross-sectional area of the groove at the radially inwardly facing surface of the bearing.

In one embodiment, the bearing further includes a fluid supply groove that is tapered from the larger cross-sectional area at the radially outwardly facing surface to the smaller cross-sectional area at the radially inwardly facing surface. In a refinement of this embodiment, the fluid supply groove has a continuously tapered width in the radial direction from the radially outwardly facing surface to the radially inwardly facing surface.

In another embodiment, the fluid supply groove has a constant width along at least a part of its length from the radially outwardly facing surface to the radially inwardly facing surface. The groove is deeper at the radially outwardly facing surface than at the radially inwardly facing surface. In a further embodiment, the depth of the fluid supply groove is constant from the radially outwardly facing surface to the radially inwardly facing surface.

In another embodiment of either aspect, each of plurality of fluid supply grooves has a larger cross-sectional area at the radially outwardly facing surface than the cross-sectional area of the fluid supply groove at the radially inwardly facing surface of the bearing body. In yet another embodiment of either aspect, each of the plurality of fluid supply grooves opens at the radially inwardly facing surface and the radially outwardly facing surface of the bearing body.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. A bearing assembly, comprising:
 a semi-circular shaped bearing body with two sets of opposing faces;
 a first set of the opposing faces including a radially outwardly facing surface and a radially inwardly facing surface;
 a second set of the opposing faces including axially outwardly opposing faces;

a plurality of fluid supply grooves extending radially in one of said axially outwardly opposing faces of said bearing body; and wherein at least one of said fluid supply grooves extends through and opens at the radially outwardly facing surface and opens at the radially inwardly facing surface, the at least one fluid supply groove having an outer opening with a larger cross-sectional area at the radially outwardly facing surface than a cross-sectional area of an exit opening of said fluid supply groove at the radially inwardly facing surface of said bearing body, wherein the exit opening is configured to allow a restricted fluid flow through the exit opening that maintains an oil supply in the at least one fluid supply groove that is gravity fed through the at least one outer opening.

2. The bearing assembly of claim 1, wherein the fluid supply groove is tapered from its larger cross-sectional area at the radially outwardly facing surface to its smaller cross-sectional area at the radially inwardly facing surface.

3. The bearing assembly of claim 2, wherein the fluid supply groove has a continuously tapered width from the radially outwardly facing surface to the radially inwardly facing surface.

4. The bearing assembly of claim 1, wherein the fluid supply groove has a constant width along at least a part of its length from the radially outwardly facing surface to the radially inwardly facing surface and the groove is deeper at the radially outwardly facing surface than at the radially inwardly facing surface.

5. The bearing assembly of claim 1, wherein a depth of the fluid supply groove is constant from the radially outwardly facing surface to the radially inwardly facing surface.

6. The bearing assembly of claim 1, wherein each of said plurality of fluid supply grooves has a larger cross-sectional area at the radially outwardly facing surface than a cross-sectional area of said fluid supply groove at the radially inwardly facing surface of said bearing body.

7. The bearing assembly of claim 1, wherein the semi-circular shaped bearing body is configured to be positioned around a crankshaft of an internal combustion engine.

8. An apparatus comprising:
an internal combustion engine with a crankshaft having associated thrust bearings;
wherein at least one of said thrust bearings includes a semi-circular shaped bearing body with two sets of opposing faces;
a first set of the opposing faces including a radially outwardly facing surface and a radially inwardly facing surface;
a second set of the opposing faces including axially outwardly facing surfaces;
a plurality of fluid supply grooves extending radially in one of said axially outwardly facing surfaces of said bearing body; and
wherein at least one of said fluid supply grooves extends through and opens at the radially outwardly facing surface and opens at the radially inwardly facing surface, the at least one fluid supply groove having an outer opening with a larger cross-sectional area at the radially outwardly facing surface than the cross-sectional area of an exit opening of said fluid supply groove at the radially inwardly facing surface of said bearing, wherein the exit opening is configured to allow a restricted fluid flow through the exit opening that maintains an oil supply in the at least one fluid supply groove that is gravity fed through the at least one outer opening.

9. The apparatus of claim 8, wherein the fluid supply groove is tapered from its larger cross-sectional area at the radially outwardly facing surface to its smaller cross-sectional area at the radially inwardly facing surface.

10. The apparatus of claim 9, wherein the fluid supply groove has a continuously tapered width from the radially outwardly facing surface to the radially inwardly facing surface.

11. The apparatus of claim 8, wherein the fluid supply groove has a constant width along at least a part of its length from the radially outwardly facing surface to the radially inwardly facing surface and the groove is deeper at the radially outwardly facing surface than at the radially inwardly facing surface.

12. The apparatus of claim 8, wherein a depth of the fluid supply groove is constant from the radially outwardly facing surface to the radially inwardly facing surface.

13. The apparatus of claim 8, wherein each of said plurality of fluid supply grooves has a larger cross-sectional area at the radially outwardly facing surface than the cross-sectional area of said fluid supply groove at the radially inwardly facing surface of said bearing body.

\* \* \* \* \*